(12) United States Patent
Shimoda et al.

(10) Patent No.: US 8,999,434 B2
(45) Date of Patent: Apr. 7, 2015

(54) PROCESS FOR PRODUCING MEMBRANE/ELECTRODE ASSEMBLY FOR POLYMER ELECTROLYTE FUEL CELLS

(75) Inventors: Hiroshi Shimoda, Chiyoda-ku (JP); Hirokazu Wakabayashi, Chiyoda-ku (JP); Shinji Kinoshita, Chiyoda-ku (JP); Toshihiro Tanuma, Chiyoda-ku (JP); Hideki Nakagawa, Chiyoda-ku (JP)

(73) Assignees: Asahi Glass Company, Limited, Tokyo (JP); Panasonic Corporation, Kadoma-shi (JP)

( * ) Notice: Subject to any disclaimer, the term of this patent is extended or adjusted under 35 U.S.C. 154(b) by 1625 days.

(21) Appl. No.: 11/626,534

(22) Filed: Jan. 24, 2007

(65) Prior Publication Data

US 2007/0286948 A1    Dec. 13, 2007

(30) Foreign Application Priority Data

Jun. 9, 2006 (JP) ................................. 2006-161063

(51) Int. Cl.
*B05D 5/12* (2006.01)
*B29C 65/00* (2006.01)
*B32B 37/00* (2006.01)
(Continued)

(52) U.S. Cl.
CPC ............ *H01M 8/1004* (2013.01); *Y02E 60/523* (2013.01); *H01M 8/0245* (2013.01)

(58) Field of Classification Search
USPC ............................................... 427/115, 372.2
See application file for complete search history.

(56) References Cited

U.S. PATENT DOCUMENTS

| 5,186,877 | A | 2/1993 | Watanabe |
| 6,855,178 | B2 | 2/2005 | Uchida et al. |
| 7,157,176 | B2 | 1/2007 | Tanuma |

(Continued)

FOREIGN PATENT DOCUMENTS

| CA | 2532945 | 1/2005 |
| EP | 1 489 677 A2 | 12/2004 |

(Continued)

OTHER PUBLICATIONS

Miyatake et al. "Polyimide ionomer membranes for PEFCs and DMFSs".*
Canadian Office Action Issued Nov. 19, 2013 in corresponding Canadian Application (3pp.).

*Primary Examiner* — Austin Murata
(74) *Attorney, Agent, or Firm* — Oblon, Spivak, McClelland, Maier & Neustadt, L.L.P.

(57) ABSTRACT

A process is provided whereby a membrane/electrode assembly for polymer electrolyte fuel cells whereby a high output voltage is obtainable within a wide range of current densities. A process for producing a membrane/electrode assembly 1 comprising a first electrode 10 having a first catalyst layer 12 and a first gas diffusion layer 14, a second electrode 20 having a second catalyst layer 22 and a second gas diffusion layer 24, and an electrolyte membrane 30, wherein the first gas diffusion layer 14, a first intermediate having the first catalyst layer 12 formed on the surface of the electrolyte membrane 30 by coating followed by annealing, and a second intermediate having the second catalyst layer 22 formed on the surface of the second gas diffusion layer 24 by coating, are bonded, so that the first catalyst layer 12 is located between the first gas diffusion layer 14 and the electrolyte membrane 30, and the second catalyst layer 22 is located between the second gas diffusion layer 24 and the electrolyte membrane 30.

15 Claims, 5 Drawing Sheets

(51) Int. Cl.
  *H01M 8/02* (2006.01)
  *H01M 8/10* (2006.01)

(56) References Cited

U.S. PATENT DOCUMENTS

| | | | |
|---|---|---|---|
| 2001/0018144 A1* | 8/2001 | Watakabe et al. | 429/33 |
| 2001/0041279 A1* | 11/2001 | Terahara et al. | 429/33 |
| 2003/0091891 A1 | 5/2003 | Yoshida et al. | |
| 2003/0134179 A1* | 7/2003 | Gascoyne et al. | 429/44 |
| 2003/0158273 A1* | 8/2003 | Kosako et al. | 521/27 |
| 2003/0190519 A1* | 10/2003 | Kordesch et al. | 429/44 |
| 2004/0258979 A1 | 12/2004 | Ye et al. | |
| 2006/0019140 A1 | 1/2006 | Kawazoe et al. | |
| 2006/0045985 A1 | 3/2006 | Kozak | |
| 2006/0063903 A1* | 3/2006 | Kasahara et al. | 526/247 |

FOREIGN PATENT DOCUMENTS

| | | |
|---|---|---|
| JP | 4-162365 | 6/1992 |
| JP | 2001-160405 | 6/2001 |
| JP | 2006-351466 | 12/2008 |
| WO | WO 02/05371 A1 | 1/2002 |
| WO | WO 02/39525 A1 | 5/2002 |
| WO | WO 2005/013396 A1 | 2/2005 |

* cited by examiner

PROCESS FOR PRODUCING MEMBRANE/ELECTRODE ASSEMBLY FOR POLYMER ELECTROLYTE FUEL CELLS

BACKGROUND OF THE INVENTION

1. Field of the Invention

The present invention relates to a process for producing a membrane/electrode assembly for polymer electrolyte fuel cells.

2. Discussion of Background

A polymer electrolyte fuel cell is constituted by a plurality of membrane/electrode assemblies stacked one on another via an electrically conductive separator having gas channels formed therein, wherein each membrane/electrode assembly comprises a polymer electrolyte membrane and electrodes (a cathode (an air electrode) and an anode (a fuel electrode)) provided on both sides of the polymer electrolyte membrane. Each electrode is constituted by a catalyst layer being in contact with the polymer electrolyte membrane and a porous gas diffusion layer disposed on the exterior side of the catalyst layer. The gas diffusion layer performs a function to diffuse air or a fuel in the electrode and a function to discharge water formed in the electrode.

The following processes are known as processes for producing membrane/electrode assemblies.

(1) A process wherein on the surface of a gas diffusion layer, a coating fluid containing an electrode catalyst is applied to form a catalyst layer thereby to obtain an electrode, and two such electrodes are subjected to hot pressing for bonding in such a state that a polymer electrolyte membrane is sandwiched between the two electrodes (Patent Document 1).

(2) A process wherein on a substrate film, a coating fluid containing a catalyst is applied to form a first catalyst layer; on the first catalyst layer, a coating fluid containing an ion exchange resin is applied to form a polymer electrolyte membrane; on the polymer electrolyte membrane, a coating fluid containing a catalyst is applied to form a second catalyst layer; from a laminate comprising the first catalyst layer, the polymer electrolyte membrane and the second catalyst layer formed on the substrate film, the substrate film is peeled off; and the laminate and two gas diffusion layers are subjected to hot pressing for bonding in such a state that the laminate is sandwiched between the two gas diffusion layers (Patent Document 2).

However, in the case of the membrane/electrode assembly obtained in the process (1), the catalyst layers of both electrodes are formed by coating directly on the surface of the gas diffusion layers, whereby part of the catalyst layers is likely to penetrate into both gas diffusion layers to clog part of voids in the gas diffusion layers. As a result, the gas diffusion properties of the gas diffusion layers tend to deteriorate, and there will be a problem such that in a high current density region, the output voltage of the polymer electrolyte fuel cell tends to be inadequate.

In the case of the membrane/electrode assembly obtained by the process (2), the polymer electrolyte membrane is formed by coating directly on the surface of the first catalyst layer, whereby part of the ion exchange resin is likely to penetrate into the first catalyst layer to clog many voids in the first catalyst layer. As a result, the gas diffusion properties of the first catalyst layer tend to deteriorate, and there will be a problem such that in a high current density region, the output voltage of the polymer electrolyte fuel cell employing such membrane/electrode assemblies tends to be inadequate.

Patent Document 1: JP-A-04-162365
Patent Document 2: WO02/005371

SUMMARY OF THE INVENTION

The present invention provides a process capable of producing a membrane/electrode assembly for polymer electrolyte fuel cells, whereby a high output voltage can be obtained within a wide range of current densities.

The process for producing a membrane/electrode assembly for polymer electrolyte fuel cells of the present invention is a process for producing a membrane/electrode assembly for polymer electrolyte fuel cells, comprising a first electrode having a first catalyst layer and a first gas diffusion layer, a second electrode having a second catalyst layer and a second gas diffusion layer, and an electrolyte membrane interposed between the first electrode and the second electrode, which comprises:

applying a coating fluid containing an ion exchange resin on a substrate, followed by annealing at from 100 to 250° C. to form an electrolyte membrane, and applying a coating fluid containing an electrode catalyst and an ion exchange resin on the surface of the obtained electrolyte membrane to form the first catalyst layer, thereby to prepare a first intermediate consisting of the electrolyte membrane and the first catalyst layer;

applying a coating fluid containing an electrode catalyst and an ion exchange resin on the surface of the second gas diffusion layer to form the second catalyst layer, thereby to prepare a second intermediate consisting of the second gas diffusion layer and the second catalyst layer; and bonding the first gas diffusion layer, the first intermediate and the second intermediate, so that the first catalyst layer is located between the first gas diffusion layer and the electrolyte membrane, and the second catalyst layer is located between the second gas diffusion layer and the electrolyte membrane.

The bonding of the first gas diffusion layer, the first intermediate and the second intermediate, is preferably carried out by hot pressing.

The first gas diffusion layer preferably comprises a gas-diffusing substrate and a first carbon layer formed on the surface of the gas-diffusing substrate by applying a coating fluid containing a fluorinated resin and carbon fiber having a fiber diameter of from 50 to 200 nm and a fiber length of from 1 to 50 μm, and the first gas diffusion layer and the first intermediate are bonded, so that the first carbon layer and the first catalyst layer are in contact with each other.

The second gas diffusion layer preferably comprises a gas-diffusing substrate and a second carbon layer formed on the surface of the gas-diffusing substrate by applying a coating fluid containing a fluorinated resin and carbon fiber having a fiber diameter of from 50 to 200 nm and a fiber length of from 1 to 50 μm, and the second catalyst layer is formed on the surface of the second gas diffusion layer, so that the second carbon layer and the second catalyst layer are in contact with each other.

It is preferred that the first intermediate comprises a substrate to be peeled, the electrolyte membrane formed on the surface of the substrate to be peeled, by applying a coating fluid containing an ion exchange resin, and the above first catalyst layer formed on the surface of the electrolyte membrane by applying a coating fluid containing an electrode catalyst and an ion exchange resin; the first gas diffusion layer and the first intermediate are bonded to prepare a laminate;

from the laminate, the substrate to be peeled, is peeled off; and then, the laminate and the second intermediate are bonded to each other.

MEANINGS OF REFERENCE SYMBOLS

1: Membrane/electrode assembly
10: First electrode
12: First catalyst layer
14: First gas diffusion layer
20: Second electrode
22: Second catalyst layer
24: Second gas diffusion layer
30: Electrolyte membrane
50: First intermediate
52: Substrate to be peeled
60: Second intermediate
70: Laminate
82: Gas-diffusing substrate
84: Carbon layer
90: Separator

DETAILED DESCRIPTION OF THE PREFERRED EMBODIMENTS

By the process for producing a membrane/electrode assembly for polymer electrolyte fuel cells of the present invention, it is possible to produce a membrane/electrode assembly for polymer electrolyte fuel cells, whereby a high output voltage can be obtained within a wide range of current densities.

In this specification, a compound represented by the formula (1) will be referred to as the compound (1). Compounds represented by other formulae will be likewise referred to.

First Embodiment

Figure 1:
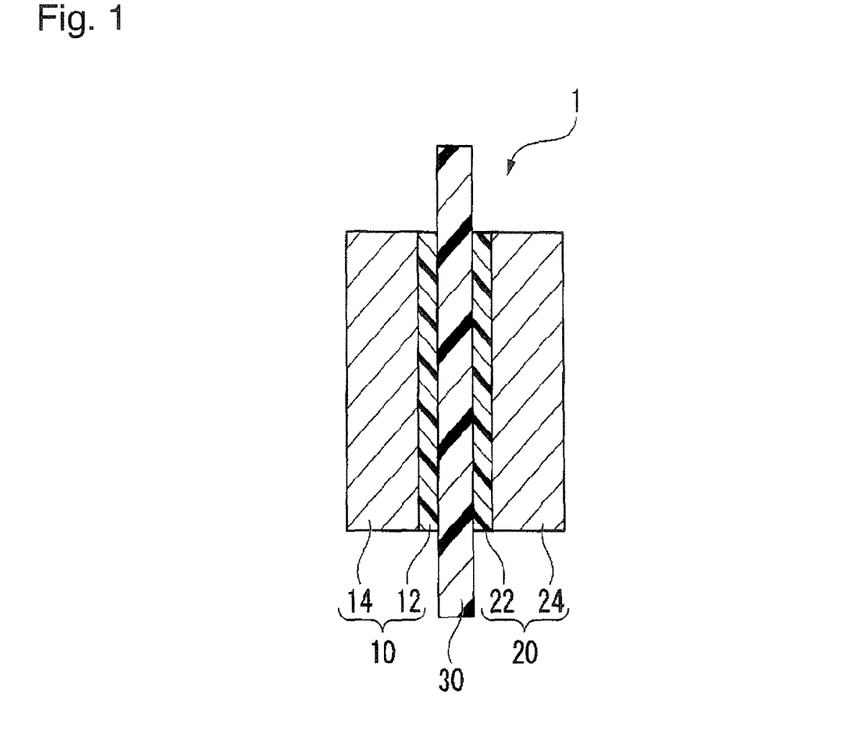
FIG. 1 is a schematic cross sectional view showing an embodiment of the membrane/electrode assembly for polymer electrolyte fuel cells.

FIG. 1 is a schematic cross sectional view showing an embodiment of the membrane/electrode assembly for polymer electrolyte fuel cells (hereinafter referred to as a membrane/electrode assembly). The membrane/electrode assembly 1 comprises a first electrode 10 having a first catalyst layer 12 and a first gas diffusion layer 14, a second electrode 20 having a second catalyst layer 22 and a second gas diffusion layer 24, and an electrolyte membrane 30 interposed between the first electrode and the second electrode in such a state that it is in contact with the first catalyst layer 12 and the second catalyst layer 22.

Catalyst Layers

The first catalyst layer 12 and the second catalyst layer 22 (hereinafter sometimes referred to generally as the catalyst layers) are layers containing an electrode catalyst and an ion exchange resin.

As the electrode catalyst, a catalyst having platinum or a platinum alloy dispersed on a carbon support, is preferred.

As the carbon support, activated carbon or carbon black may, for example, be mentioned. The specific surface area of the carbon support is preferably at least 200 m$^2$/g. The specific surface area of the carbon support is measured by adsorption of nitrogen to the carbon surface by means of a BET specific surface area measuring device.

The platinum alloy is preferably an alloy of platinum with at least one metal selected from the group consisting of platinum group metals other than platinum (ruthenium, rhodium, palladium, osmium and iridium), gold, silver, chromium, iron, titanium, manganese, cobalt, nickel, molybdenum, tungsten, aluminum, silicon, zinc and tin. Such a platinum alloy may contain an intermetallic compound of platinum with a metal to be alloyed with platinum.

As a platinum alloy for an anode, an alloy containing platinum and ruthenium is preferred, since the activity of the electrode catalyst will thereby be stabilized even when a gas containing carbon monoxide is supplied.

The amount of platinum or a platinum alloy to be supported is preferably from 10 to 70 mass % of the electrode catalyst (100 mass %).

The ion exchange capacity of the ion exchange resin is preferably from 0.5 to 2.0 meq/g dry resin, particularly preferably from 0.8 to 1.5 meq/g dry resin from the viewpoint of the electrical conductivity and gas permeability.

As the ion exchange resin, a fluorinated ion exchange resin or a non-fluorinated ion exchange resin may, for example, be mentioned, and from the viewpoint of the durability, a fluorinated ion exchange resin is preferred.

The fluorinated ion exchange resin is preferably a perfluorocarbon polymer having sulfonic acid groups (which may contain etheric oxygen atoms), particularly preferably a copolymer comprising units based on tetrafluoroethylene and units based on perfluorovinyl ether having a sulfonic acid group. Such a copolymer is usually obtained by copolymerizing tetrafluoroethylene with a perfluorovinyl ether having a precursor group for a sulfonic acid group such as a —SO$_2$F group, followed by hydrolysis to an acid form.

The compound (1) is preferred as the perfluorovinyl ether having a precursor group for a sulfonic acid group.

$$CF_2\!=\!CF(OCF_2CFX)_m\text{—}O_p\text{—}(CF_2)_n\text{—}SO_2F \tag{1}$$

In the formula (1), m is an integer of from 0 to 3, n is an integer of from 1 to 12, p is 0 or 1, and X is F or CF$_3$.

As the compound (1), compounds (1-1) to (1-3) are preferred.

$$CF_2\!=\!CFO(CF_2)_qSO_2F \tag{1-1}$$

$$CF_2\!=\!CFOCF_2CF(CF_3)O(CF_2)_rSO_2F \tag{1-2}$$

$$CF_2\!=\!CF(OCF_2CF(CF_3))_xO(CF_2)_sSO_2F \tag{1-3}$$

In the above formulae, each of q, r and s is an integer of from 1 to 8, and t is an integer of from 1 to 3.

The non-fluorinated ion exchange resin may, for example, be a sulfonated polyarylene, a sulfonated polybenzoxazole, a sulfonated polybenzothiazole, a sulfonated polybenzoimidazole, a sulfonated polysulfone, a sulfonated polyether sulfone, a sulfonated polyether ether sulfone, a sulfonated polyphenylene sulfone, a sulfonated polyphenylene oxide, a sulfonated polyphenylene sulfoxide, a sulfonated polyphenylene sulfide, a sulfonated polyphenylene sulfide sulfone, a sulfonated polyether ketone, a sulfonated polyether ether ketone, a sulfonated polyether ketone ketone or a sulfonated polyimide.

The ratio of the electrode catalyst to the fluorinated ion exchange resin (electrode catalyst/ion exchange resin) is preferably from 4/6 to 9.5/0.5 (mass ratio), particularly preferably from 6/4 to 8/2, from the viewpoint of the electrical conductivity and water repellency of the electrode.

The amount of platinum contained in the catalyst layer is preferably from 0.01 to 0.5 mg/cm$^2$, more preferably from 0.05 to 0.35 mg/cm$^2$, from the viewpoint of the optimum thickness to carry out the after-mentioned electrode reaction efficiently.

The thickness of the catalyst layer is preferably at most 20 μm, more preferably from 1 to 15 μm with a view to facilitating the gas diffusion in the catalyst layer and improving the characteristics of the polymer electrolyte fuel cell. Further, the thickness of the catalyst layer is preferably uniform. If the thickness of the catalyst layer is made thin, the amount of the electrode catalyst present per unit area decreases, whereby the activity of the reaction tends to be low. However, in such a case, a supported catalyst having platinum or a platinum alloy supported in a high supported ratio may be used as an electrode catalyst, whereby even if it is thin, the amount of the electrode catalyst will not be deficient, and it will be possible to maintain the reaction activity of the electrode to be high.

Gas Diffusion Layers

The first gas diffusion layer 14 and the second gas diffusion layer 24 (hereinafter sometimes referred to generally as gas diffusion layers) are layers each having a gas-diffusing substrate.

The gas-diffusing substrate is a porous substrate having electrical conductivity. The gas-diffusing substrate may, for example, be carbon cloth, carbon paper or carbon felt.

The gas-diffusing substrate is preferably treated for water repellency by using e.g. polytetrafluoroethylene or a mixture of polytetrafluoroethylene with carbon black. The thickness of the gas diffusion layer is preferably from 100 to 400 μm, more preferably from 140 to 350 μm.

Electrolyte Membrane

The electrolyte membrane 30 is made of an ion exchange resin membrane.

As the ion exchange resin constituting the membrane may be the same as the ion exchange resin for the catalyst layer.

The thickness of the electrolyte membrane is preferably at most 50 μm, more preferably from 3 to 40 μm, particularly preferably from 5 to 30 μm. By adjusting the thickness of the electrolyte membrane 30 to be at most 50 μm, the electrolyte membrane 30 can readily be brought to a dried state, whereby deterioration of the characteristics of the polymer electrolyte fuel cell can be suppressed.

By adjusting the thickness of the electrolyte membrane 30 to be at least 3 μm, short circuiting can be avoided.

Process for Producing Membrane/Electrode Assembly

The process for producing a membrane/electrode assembly of the present invention is a process wherein a first intermediate having a first catalyst layer formed by applying a coating fluid containing an electrode catalyst and an ion exchange resin on the surface of an electrolyte membrane, and a second intermediate having a second gas diffusion layer and a second catalyst layer formed by applying a coating fluid containing an electrode catalyst and an ion exchange resin on the surface of the second gas diffusion layer, are bonded so that the first catalyst layer is located between a first gas diffusion layer and the electrolyte membrane, and the second catalyst layer is located between the second gas diffusion layer and the electrolyte membrane. And, in the step for preparing the first intermediate, the coating fluid containing the ion exchange resin is applied on the substrate, followed by annealing from 100 to 250° C. to form an electrolyte membrane, and the above first catalyst layer is formed on the surface of the obtained electrolyte membrane.

As the process for producing a membrane/electrode assembly 1 of the first embodiment, the following processes may specifically be mentioned.

(I) A process wherein the first gas diffusion layer and the first intermediate are bonded to form a laminate, and then, the laminate and the second intermediate are bonded.

(II) A process wherein the first gas diffusion layer, the first intermediate and the second intermediate are bonded at the same time.

Process (I)

Figure 2:
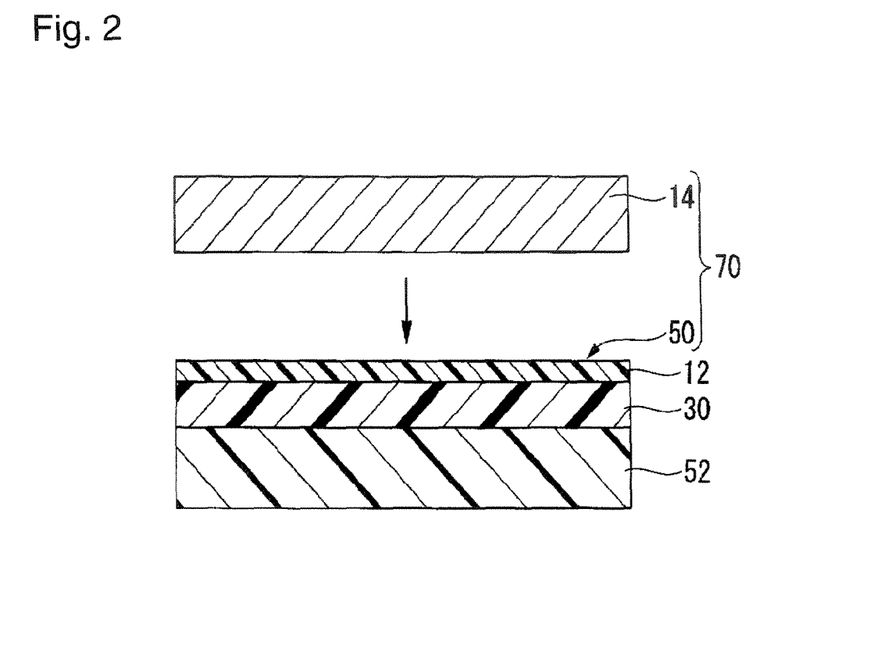
FIG. 2 is a schematic cross sectional view showing one step in the process for producing a membrane/electrode assembly for polymer electrolyte fuel cells of the present invention.

The process (I) may, for example, be a process having the following steps (I-1) to (I-5):

(I-1) a step of preparing a first gas diffusion layer 14 as shown in FIG. 2.

(I-2) a step of preparing a first intermediate 50 having a substrate 52 to be peeled, an electrolyte membrane 30 and a first catalyst layer 12, as shown in FIG. 2.

Figure 3:
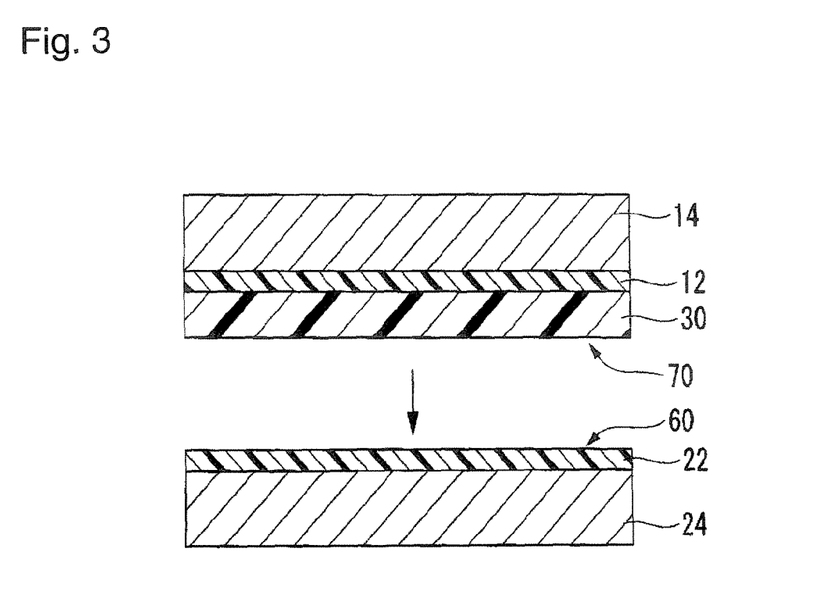
FIG. 3 is a schematic cross sectional view showing one step in the process for producing a membrane/electrode assembly for polymer electrolyte fuel cells of the present invention.

(I-3) a step of preparing a second intermediate 60 having a second gas diffusion layer 24 and a second catalyst layer 22 (i.e. a second electrode 20), as shown in FIG. 3.

(I-4) a step of bonding the first gas diffusion layer 14 and the first intermediate 50 so that the first catalyst layer 12 is located between the first gas diffusion layer 14 and the electrolyte membrane 30, to form a laminate 70, as shown in FIG. 2.

(I-5) a step of bonding the laminate 70 and the second intermediate 60 after peeling the substrate 52 to be peeled, from the laminate 70, so that the second catalyst layer 22 is located between the second gas diffusion layer 24 and the electrolyte membrane 30, as shown in FIG. 3.

Step (I-1):

As the first gas diffusion layer 14, a gas-diffusing substrate such as carbon paper, carbon cloth or carbon felt may be used as it is. If necessary, the gas-diffusing substrate may be treated for water repellency by means of a solution or dispersion containing a water repellent fluororesin. By such treatment for water repellency, it is possible to avoid clogging of pores formed in the gas diffusion layer by e.g. water formed in the cathode catalyst layer to suppress the gas diffusion. In such a case, from the viewpoint of the electrical conductivity of the membrane/electrode assembly, it is more preferred to treat the surface of the gas diffusion layer with a dispersion containing the water repellent fluororesin and an electrically conductive carbon such as carbon black. As the water repellent fluororesin, polytetrafluoroethylene may, for example, be mentioned. Here, the surface treated side of the gas diffusion layer is disposed on the catalyst layer side. The thickness of the gas diffusion layer is usually preferably from 50 to 400 μm.

Step (I-2):

The first intermediate 50 is prepared by applying a coating fluid containing an ion exchange resin (hereinafter referred to as a coating fluid for an electrolyte membrane) on the surface of the substrate 52 to be peeled, followed by annealing to form an electrolyte membrane 30, and then applying a coating fluid containing an electrode catalyst and an ion exchange resin (hereinafter referred to as a coating fluid for the first catalyst layer) on the surface of the electrolyte membrane 30, to form a first catalyst layer 12.

As the substrate 52 to be peeled, a resin film may, for example, be mentioned.

As the material for the resin film, the following resins may be mentioned.

A non-fluorinated resin such as polyethylene terephthalate, polyethylene, polypropylene or polyimide.

A fluorinated resin such as polytetrafluoroethylene, an ethylene/tetrafluoroethylene copolymer (ETFE), an ethylene/hexafluoropropylene copolymer, a tetrafluoroethylene/perfluoro(alkyl vinyl ether) copolymer or a poly(vinylidene fluoride).

The non-fluorinated resin film is preferably surface-treated with a release agent.

The coating fluid for an electrolyte membrane is prepared by dissolving or dispersing an ion exchange resin in a solvent.

The coating fluid for the first catalyst layer is prepared by dispersing an electrode catalyst in a solvent and dissolving or dispersing an ion exchange resin in the solvent.

In a case where the ion exchange resin is a fluorinated ion exchange resin, an alcohol or a fluorinated solvent is preferred as the solvent.

The alcohol may, for example, be ethanol, n-propanol, isopropanol, n-butanol, isobutanol or tert-butanol. To increase the solubility of the ion exchange resin, a solvent mixture of an alcohol with water may be employed.

The following may be mentioned as the fluorinated solvent:

A hydrofluorocarbon such as 2H-perfluoropropane, 1H,4H-perfluorobutane, 2H,3H-perfluoropentane, 3H,4H-perfluoro(2-methylpentane), 2H,5H-perfluorohexane, or 3H-perfluoro(2-methylpentane).

A fluorocarbon such as perfluoro(1,2-dimethylcyclobutane), perfluorooctane, perfluoroheptane or perfluorohexane.

A hydrochlorofluorocarbon such as 1,1-dichloro-1-fluoroethane, 1,1,1-trifluoro-2,2-dichloroethane, 3,3-dichloro-1,1,1,2,2-pentafluoropropane, or 1,3-dichloro-1,1,2,2,3-pentafluoropropane.

A fluoroether such as 1H,4H,4H-perfluoro(3-oxapentane), or 3-methoxy-1,1,1,2,3,3-hexafluoropropane.

A fluorinated alcohol such as 2,2,2-trifluoroethanol, 2,2,3,3,3-pentafluoro-1-propanol, or 1,1,1,3,3,3-hexafluoro-2-propanol.

In a case where the ion exchange resin is a non-fluorinated ion exchange resin, the solvent may, for example, be N,N-dimethylformamide, dimethylsulfoxide, methylene chloride, chloroform, carbon tetrachloride, 1,1,1-trichloroethane, 1,1,2-trichloroethane, trichloroethylene, or tetrachloroethylene.

The solid content in the coating fluid for the electrolyte membrane is preferably from 15 to 30 mass %, more preferably from 20 to 30 mass %.

The solid content in the coating fluid for the first catalyst layer is preferably from 4 to 15 mass %, more preferably from 8 to 12 mass %.

By adjusting the solid content of the coating fluid within the above range, the coating fluid will have a proper viscosity and can be uniformly applied, and a coating film thereby formed will be free from cracks.

Further, in the coating fluid for the first catalyst layer, a solvent having a function to dissolve the ion exchange resin is preferably contained in an amount of from 5 to 100%, more preferably from 30 to 100%, based on the total mass of the solvent. By such a construction, when the coating fluid for the first catalyst layer is applied on the electrolyte membrane, a part of the surface of the electrolyte membrane will be dissolved by the above solvent and bonded to the electrolyte in the catalyst layer. As a result, the bond strength between the electrolyte membrane and the catalyst layer will be sufficiently high. As such a solvent, in the case of an electrolyte membrane made of a fluorinated ion exchange resin, an alcohol or a fluorinated solvent may, for example, be mentioned, and ethanol, n-propanol or isopropanol may be used particularly preferably.

During the operation of a polymer electrolyte fuel cell, water will be formed. Usually, the catalyst layer undergoes no substantial dimensional change in a flat plane direction due to absorption of water during the operation of the fuel cell, while the electrolyte membrane is likely to undergo a dimensional change due to absorption of water. However, if the catalyst layer is adhered to the surface of the electrolyte membrane with a sufficient bond strength, the catalyst layer which undergoes no substantial dimensional change will suppress the dimensional change in a flat plane direction of the electrolyte membrane (the side being in contact with the catalyst layer) due to absorption of water, whereby a dimensional change of the electrolyte membrane tends to hardly take place. On the other hand, when the bond strength of the electrolyte membrane and the catalyst layer is low, in a humidity change to which the membrane/electrode assembly is exposed during the operation of the fuel cell, there will be a problem such that the electrolyte membrane tends to be delaminated from the catalyst layer, and the electrolyte membrane will undergo a substantial deformation. As described above, in a case where a first coating fluid for a catalyst layer is applied on the electrolyte membrane to form a first catalyst layer, as described above, a high bond strength can be obtained, whereby the electrolyte membrane will not delaminate from the catalyst layer, and a deformation of the electrolyte membrane tends to scarcely occur.

It is ascertained that the electrolyte membrane undergoes no substantial deformation as long as at least one side thereof is sufficiently bonded to the catalyst layer, and it is not required that both sides of the electrolyte membrane be strongly bonded to the catalyst layers.

The coating method may be a batch type coating method or a continuous type coating method.

The batch type coating method may, for example, be a bar coater method, a spin coater method or a screen printing method.

The continuous type coating method may, for example, be a post measuring method or a pre-measuring method. The post measuring method is a method wherein an excess coating fluid is applied, and the coating fluid is subsequently removed to obtain a prescribed thickness. The pre-measuring method is a method wherein the coating fluid is applied in an amount required to obtain a prescribed thickness.

The post measuring method may, for example, be an air doctor coater method, a blade coater method, a rod coater method, a knife coater method, a squeeze coater method, an impregnation coater method or a comma coater method.

The pre-measuring method may, for example, be a die coater method, a reverse roll coater method, a transfer roll coater method, a gravure coater method, a kiss roll coater method, a cast coater method, a spray coater method, a curtain coater method, a calender coater method or an extrusion coater method.

The application method is preferably a screen printing method or a die coater method from such a viewpoint that a uniform electrolyte membrane 30 or a first catalyst layer 12 can be formed, and a die coater method is more preferred from the viewpoint of the production efficiency.

After applying a coating fluid for an electrolyte membrane on the surface of a substrate 52 to be peeled, drying is carried out to form an electrolyte membrane 30. The drying temperature is preferably from 70 to 170° C. After the drying or at the same time as the drying, the electrolyte membrane 30 is subjected to annealing. The annealing temperature is from 100 to 250° C., preferably from 130 to 220° C. The optimum temperature for the annealing varies depending upon the polymer constituting the membrane, and it is preferred to carry out the annealing at a temperature higher than the glass transition temperature (Tg) of the polymer and not higher than (Tg+100) By forming a catalyst layer on a membrane thus annealed within the above temperature range, a membrane/electrode assembly with a high output can be obtained. The reason is not clearly understood, but may be considered that by the annealing of the membrane, the water content in the membrane is adjusted, and by forming a catalyst layer on the membrane in a state stabilized by the annealing, the adhesion between the membrane and the catalyst layer is increased, whereby a membrane/electrode assembly with a high output will be obtained.

Here, the annealing time is preferably from 5 minutes to 3 hours, particularly preferably from 10 minutes to 1 hour. If the annealing time is too short, the above described effects may not be obtained sufficiently. On the other hand, if the annealing time is too long, the productivity decreases.

Further, if the membrane/electrode assembly is used for a long time, the output will decrease due to the deterioration of the membrane. This is considered attributable to formation of a peroxide. Accordingly, it is preferred to add to the membrane something to inhibit formation of a peroxide. This inhibitor is preferably incorporated in the coating fluid for an electrolyte membrane.

Then, after applying the coating fluid for a first catalyst layer on the surface of the electrolyte membrane 30, drying is carried out to form a first catalyst layer 12. The temperature for the drying is preferably from 70 to 150° C.

Step (I-3):

A second intermediate 60 is prepared by applying a coating fluid (hereinafter referred to as a coating fluid for a second catalyst layer) containing an electrode catalyst and an ion exchange resin on the surface of a second gas diffusion layer 24, to form a second catalyst layer 22.

The coating fluid for the second catalyst layer is prepared by dispersing an electrode catalyst in a solvent and dissolving or dispersing an ion exchange resin in the solvent.

The solvent may be the same as the solvent for the coating fluid for the first catalyst layer.

The solid content of the coating fluid for the second catalyst layer is preferably within the same range as the solid content of the coating fluid for the first catalyst layer.

The coating method may be the same method as in the step (I-2).

After applying the coating fluid for the second catalyst layer on the surface of the second gas diffusion layer 24, drying is carried out to form a second catalyst layer 22. The drying temperature is preferably from 70 to 170° C.

Steps (I-4) to (I-5):

The bonding method may, for example, be a hot pressing method, hot roll pressing or supersonic fusion. From the viewpoint of the uniformity in the plane, the hot pressing method is preferred.

The temperature of the press plate in the pressing machine is preferably from 100 to 150° C.

The pressing pressure is preferably from 0.5 to 2.0 MPa.

Process (II)

The process (II) may, for example, be a process comprising the following steps (II-1) to (II-5).

(II-1): A step of preparing a first gas diffusion layer 14 as shown in FIG. 2.

(II-2): A step of preparing a first intermediate 50 having a substrate 52 to be peeled, an electrolyte membrane 30 and a first catalyst layer 12 as shown in FIG. 2.

(II-3): A step of preparing a second intermediate 60 (i.e. a second electrode 20) having a second gas diffusion layer 24 and a second catalyst layer 22 as shown in FIG. 3.

(II-4): A step of peeling the substrate 52 to be peeled, from the first intermediate 50.

(II-5): A step of simultaneously bonding the first gas diffusion layer 14, the first intermediate 50 and the second intermediate 60, so that the first catalyst layer 12 is located between the first gas diffusion layer 14 and the electrolyte membrane 30, and the second catalyst layer 22 is located between the second gas diffusion layer 24 and the electrolyte membrane 30, thereby to form a membrane/electrode assembly 1.

Steps (II-1) to (II-3) may be carried out in the same manner as steps (I-1) to (I-3).

The bonding method and conditions in step (II-5) may be the same method and conditions as in steps (I-4) and (I-5).

In the membrane/electrode assembly 1 produced in the first embodiment, the second electrode 20 is preferably an anode for the following reason.

In a polymer electrolyte fuel cell, it is common that a gas (fuel) containing hydrogen is supplied to an anode, and a gas (air) containing oxygen is supplied to a cathode. In the second anode 20, a part of the coating fluid for the second catalyst layer penetrates into the second gas diffusion layer 24 in step (I-3) or (II-3), whereby a part of the second gas diffusion layer 24 is likely to be clogged. Therefore, if the second electrode 20 is made to be a cathode, oxygen having a lower permeability than hydrogen must pass the second gas diffusion layer 24, whereby the gas diffusion property tends to be low. On the other hand, if the second electrode 20 is made to be an anode, hydrogen may be relatively easily permeable even at the clogged portion, whereby the gas diffusion property tends to be scarcely lowered. Namely, the gas diffusion layer of the cathode is required to be maintained to be porous, while the gas diffusion layer of the anode may not be so porous as the cathode. Accordingly, when the second electrode 20 is made to be an anode, the porosity of the cathode may be maintained, and a polymer electrolyte fuel cell having a high performance may be obtained.

Second Embodiment

Figure 4:
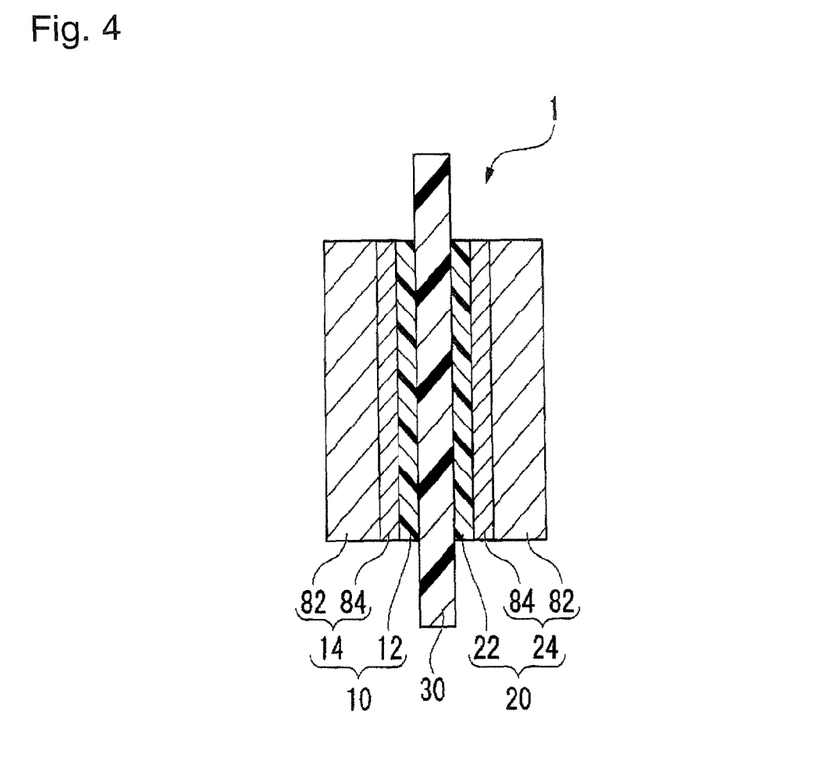
FIG. 4 is a schematic cross sectional view showing another embodiment of the membrane/electrode assembly for polymer electrolyte fuel cells.

FIG. 4 is a schematic cross sectional view showing a membrane/electrode assembly 1 wherein the gas diffusion layer has a carbon layer 84 on the surface of a gas-diffusing substrate 82. A part of the carbon layer 84 may penetrate into voids in the gas-diffusing substrate 82. The gas-diffusing substrate 82 may be treated for water repellency with a coating fluid containing a fluororesin, or electroconductive carbon particles and a fluororesin, and the carbon layer 84 may be formed thereon.

Carbon Layer

The carbon layer 84 is a layer comprising carbon fiber and a fluorinated resin. The fluorinated resin is preferably a fluorinated ion exchange resin from the viewpoint of the dispersibility of the carbon fiber, more preferably the same fluorinated ion exchange resin as for the catalyst layer from the viewpoint of the adhesion at the interface with the catalyst layer.

The carbon fiber is preferably carbon nanofiber, since it is fine and has electron conductivity. The carbon nanofiber may, for example, be gas phase-grown carbon fiber, or carbon nanotube (single wall, double wall, multi wall or cup-laminated form).

The carbon fiber has a fiber diameter of from 50 to 200 nm and a fiber length of from 1 to 50 μm. By using such carbon fiber, it will be entangled with an electron conductive material (platinum or a platinum alloy and a carbon support) contained in the catalyst layer at the interface between the carbon layer 84 and the catalyst layer, whereby a fresh electroconductive path will be formed in addition to the conductive path by point contact of the electronconductive material, and the electron-conductivity of the catalyst layer will be improved. Further, such carbon fiber is likely to be entangled at the time of coating with the coating fluid containing the carbon fiber, whereby voids are likely to be formed, and such voids will function as gas channels. In the polymer electrolyte fuel cell, water (steam) will be formed in the catalyst layer of the cathode side, and such water will be discharged out of the system through the gas diffusion layer disposed adjacent to the catalyst layer. By providing a carbon layer 84 made mainly of such carbon fiber between the catalyst layer and the gas diffusion layer, water will be readily removed from the catalyst layer to the carbon layer 84 by a capillary phenomenon, whereby a flooding problem during the operation of the polymer electrolyte fuel cell will be solved.

The ratio of the carbon fiber to the fluorinated resin (carbon fiber/fluorinated resin) is preferably from 1/0.1 to 1/5 (mass ratio), more preferably from 1/0.2 to 1/1. Within such a range, the dispersibility of the carbon fiber, the adhesion between the carbon layer 84 and the gas-diffusing substrate 82, and the gas-diffusing property and water-discharging property of the carbon layer 84 will be good. The thickness of the carbon layer 84 is preferably from 2 to 20 μm. Within such a range, the adhesion between the carbon layer 84 and the gas-diffusing substrate 82 will be good, and the contact resistance between the gas diffusion layer and the catalyst layer can be made sufficiently small, and the membrane/electrode assembly can be made thin.

Process for Producing Membrane/Electrode Assembly

As the process for producing a membrane/electrode assembly 1 according to the second embodiment, the following processes may specifically be mentioned.

(i) A process wherein a first gas diffusion layer and a first intermediate are bonded to form a laminate, and then, the laminate and a second intermediate are bonded.

(ii) A process wherein a first gas diffusion layer, a first intermediate and a second intermediate are bonded at the same time.

Process (i)

The process (i) may, for example, be a process comprising the following steps (i-1) to (i-5).

Figure 5:
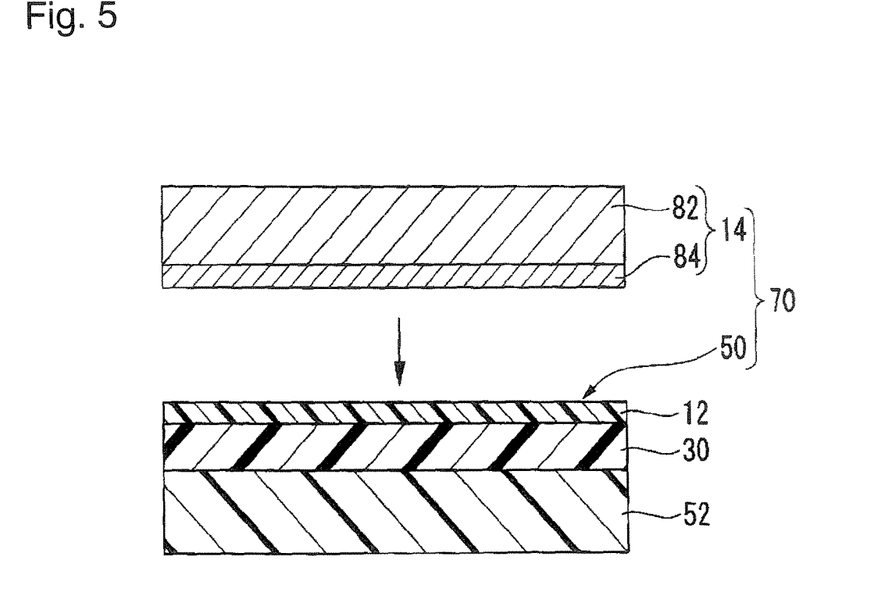
FIG. 5 is a schematic cross sectional view showing one step in the process for producing a membrane/electrode assembly for polymer electrolyte fuel cells of the present invention.

(i-1): A step of preparing a first gas diffusion layer 14 having (a first) carbon layer 84 formed on the surface of a gas-diffusing substrate 82, as shown in FIG. 5.

(i-2): A step of preparing a first intermediate 50 comprising a substrate 52 to be peeled, an electrolyte membrane 30 and a first catalyst layer 12, as shown in FIG. 5.

Figure 6:
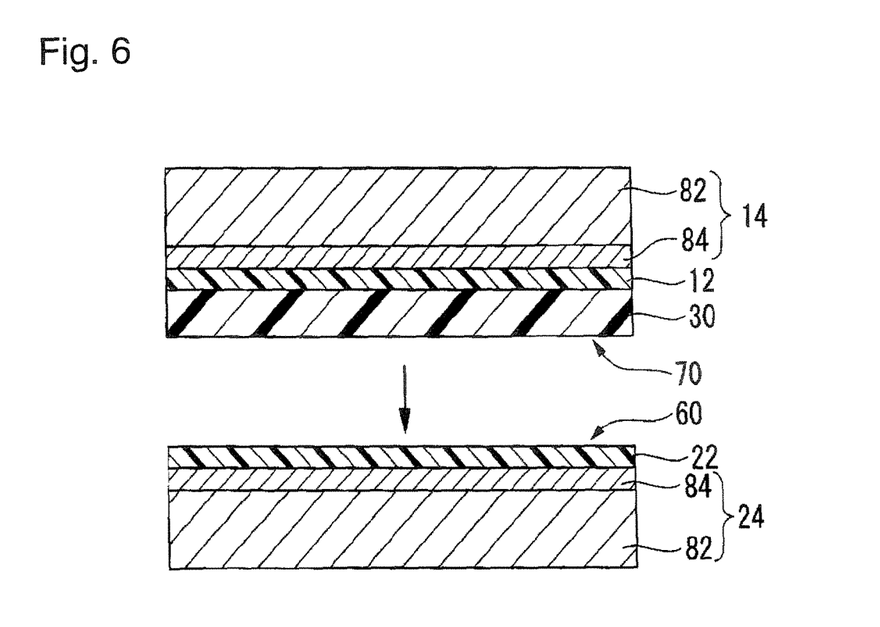
FIG. 6 is a schematic cross sectional view showing one step in the process for producing a membrane/electrode assembly for polymer electrolyte fuel cells of the present invention.

(i-3): A step of preparing a second intermediate 60 (i.e. a second electrode 20) having a second gas diffusion layer 24 having (a second) carbon layer 84 formed on the surface of the gas-diffusing substrate 82, and a second catalyst layer 22 being in contact with (the second) carbon layer 84, as shown in FIG. 6.

(i-4): A step of bonding the first gas diffusion layer 14 and the first intermediate 50 so that the first catalyst layer 12 is located between the first gas diffusion layer 14 and the electrolyte membrane 30, and (the first) carbon layer 84 and the first catalyst layer 12 are in contact with each other, thereby to form a laminate 70, as shown in FIG. 5.

(i-5): A step of bonding the laminate 70 and the second intermediate 60 after peeling the substrate 52 to be peeled from the laminate 70, so that the catalyst layer 22 is located between the second gas diffusion layer 24 and the electrolyte membrane 30, to form a membrane/electrode assembly 1, as shown in FIG. 6.

Step (i-1):

The first gas diffusion layer 14 is prepared by applying a coating fluid (hereinafter referred to as a coating fluid for a carbon layer) containing carbon fiber having a fiber diameter of from 50 to 200 nm and a fiber length of from 1 to 50 μm and a fluorinated resin on the surface of the gas-diffusing substrate 82, to form (the first) carbon layer 84.

The coating fluid for a carbon layer is prepared by dispersing carbon fiber in a solvent, and dissolving or dispersing a fluorinated resin in the solvent.

When the fluorinated resin is a fluorinated ion exchange resin, the solvent is preferably the above mentioned alcohol or a fluorinated solvent.

The solid content in the coating fluid for a carbon layer is preferably from 5 to 15 mass %, more preferably from 8 to 12 mass %. By adjusting the solid content of the coating fluid to be within this range, the coating fluid will have a proper viscosity and can be uniformly applied, and the coating film thereby formed will be free from cracks.

The coating method may be the above mentioned batch type coating method or continuous type coating method. From such a viewpoint that a uniform (first) carbon layer 84 can be formed, a screen printing method or a die coater method is preferred, and from the viewpoint of the production efficiency, the die coater method is more preferred.

After applying the coating fluid for a carbon layer on the surface of the gas-diffusing substrate 82, drying is carried out to form (a first) carbon layer 84. The drying temperature is preferably from 80 to 150° C.

Step (i-2):

The preparation of the first intermediate may be carried out in the same manner as in step (I-2) in the first embodiment.

Step (i-3):

The preparation of the second gas diffusion layer 24 may be carried out in the same manner as in step (i-1).

The second catalyst layer 22 is formed on the surface of the second gas diffusion layer 24 so that (the second) carbon layer 84 and the second catalyst layer 22 are in contact with each other.

The formation of the second catalyst layer 22 may be carried out in the same manner as in step (I-3) in the first embodiment.

Steps (i-4) to (i-5)

The bonding method and conditions in steps (i-4) and (i-5) may be the same method and conditions as in steps (I-4) and (I-5) in the first embodiment.

Process (ii)

The process (ii) may, for example, be a process comprising the following steps (ii-1) to (ii-5).

(ii-1): A step of preparing a first gas diffusion layer 14 having (a first) carbon layer 84 formed on the surface of a gas-diffusing substrate 82, as shown in FIG. 5.

(ii-2): A step of preparing a first intermediate 50 comprising a substrate 52 to be peeled, an electrolyte membrane 30 and a first catalyst layer 12, as shown in FIG. 5.

(ii-3): A step of preparing a second intermediate 60 (i.e. a second electrode 20) comprising a second gas diffusion layer 24 having (a second) carbon layer 84 formed on the surface of the gas-diffusing substrate 82, and a second catalyst layer 22 in contact with (the second) carbon layer 84, as shown in FIG. 6.

(ii-4): A step of peeling the substrate 52 to be peeled from the first intermediate 50.

(ii-5): A step of bonding the first gas diffusion layer 14, the first intermediate 50 and the second intermediate 60 at the same time so that the first catalyst layer 12 is located between the first gas diffusion layer 14 and the electrolyte membrane 30, and (the first) carbon layer 84 and the first catalyst layer 12 are in contact with each other, and the second catalyst layer 22 is located between the second gas diffusion layer 24 and the electrolyte membrane 30, to form a membrane/electrode assembly 1.

Steps (ii-1) to (ii-3) may be carried out in the same manner as in steps (i-1) to (i-3).

The bonding method and conditions in step (ii-5) may be the same method and conditions as in steps (i-4) and (i-5).

In the membrane/electrode assembly 1 produced according to the second embodiment, the carbon layer 84 is present between the gas-diffusing substrate 82 and the catalyst layer, whereby voids in the gas-diffusing substrate 82 tend to be scarcely clogged. Therefore, it is possible to suppress lowering of the output voltage of the polymer electrolyte fuel cell in all regions. Further, in a case where the carbon layer 84 is present, it is possible to prevent clogging of the second gas diffusion layer, whereby a membrane/electrode assembly having a high performance can be obtained when the second gas diffusion layer side is used either as a cathode or an anode.

Figure 7:
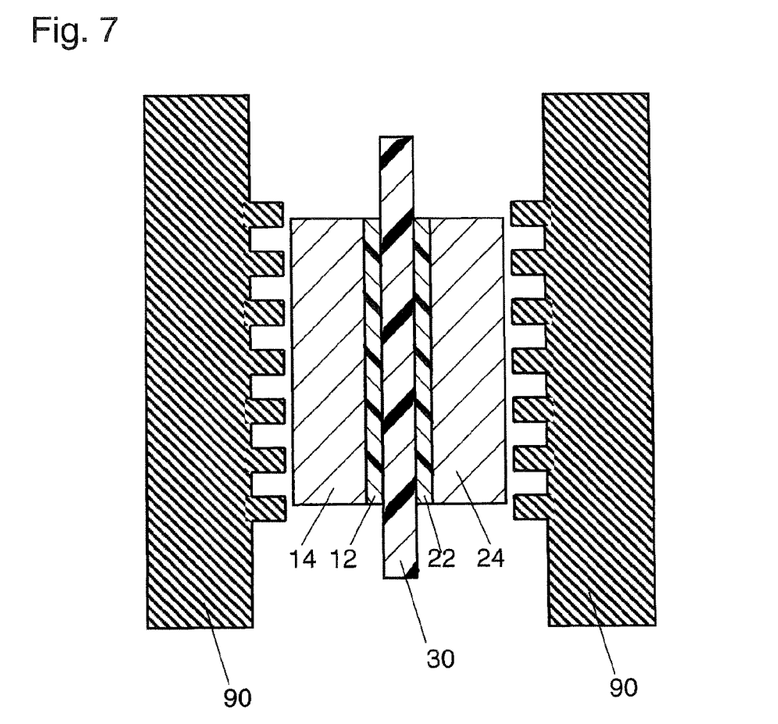
FIG. 7 is a cross sectional view showing one embodiment of a polymer electrolyte fuel cell.

As shown by a cross sectional view in FIG. 7, on each side of the membrane/electrode assembly produced by the first or second embodiment, a separator 90 having grooves 100 formed as gas channels, is disposed to obtain a polymer electrolyte fuel cell. The separator 90 may be a separator made of a various electroconductive material, such as a separator made of metal, a separator made of carbon or a separator made of a material having graphite and a resin mixed.

In the polymer electrolyte fuel cell, power generation is carried out by supplying a gas containing oxygen to the cathode and a gas containing hydrogen to the anode. Further, the membrane/electrode assembly of the present invention may be applied also to a methanol fuel cell whereby power generation is carried out by supplying methanol to the anode.

In the above described membrane/electrode assembly of the present invention, the first intermediate comprising the first gas diffusion layer and the first catalyst layer formed by applying the coating fluid for a first catalyst layer on the surface of an electrolyte membrane, and the second intermediate having the second catalyst layer formed by applying the coating fluid for a second catalyst layer on the surface of the second gas diffusion layer, are bonded, whereby it is possible to avoid clogging of voids in the first gas diffusion layer. As a result, deterioration in the gas diffusion property of the gas diffusion layer is little, and it is possible to suppress lowering of the output voltage of the polymer electrolyte fuel cell in a high current density region.

Further, since the first intermediate having the first catalyst layer formed by applying the coating fluid for the first catalyst layer on the surface of the electrolyte membrane, and the second intermediate having the second catalyst layer formed by applying the coating fluid for the second catalyst layer on the surface of the second gas diffusion layer, are bonded, it is unnecessary to form the electrolyte membrane directly on the surface of the first catalyst layer by coating, as heretofore required. Therefore, it is possible to avoid penetration of a part of the ion exchange resin into the first catalyst layer, and it is possible to avoid clogging of many voids in the first catalyst layer. As a result, it is possible to avoid deterioration in the gas-diffusing properties of the first catalyst layer, and it is possible to suppress lowering of the output voltage of the polymer electrolyte fuel cell in a high current density region.

Further, as described above, as the first catalyst layer is applied on the surface of the electrolyte membrane, a part of the surface of the electrolyte membrane is dissolved by the action of the solvent in the coating fluid and effectively bonded to the electrolyte in the catalyst layer, whereby the bond strength between the electrolyte membrane and the catalyst layer will be sufficiently obtained. As a result, the catalyst layer will suppress the dimensional change of the electrolyte membrane due to a change in the humidity during the operation of the cell.

Figure 8A:
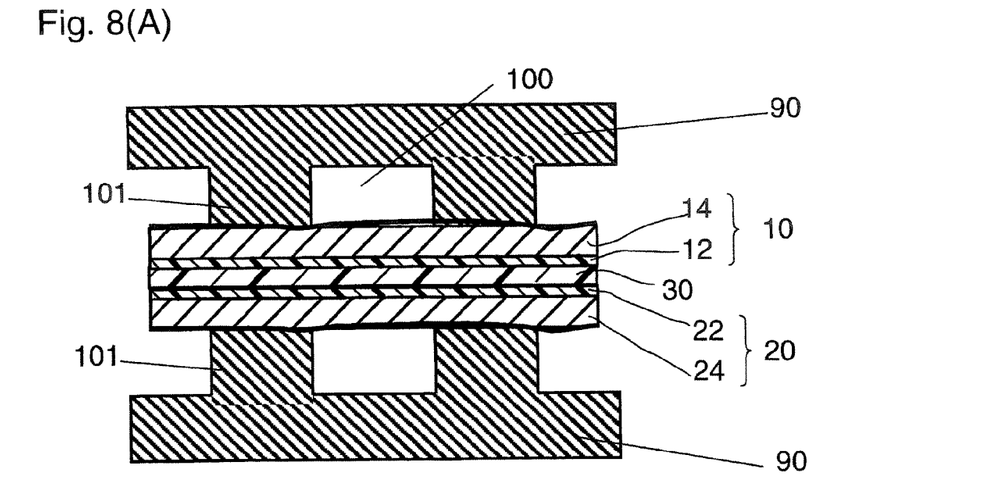
FIG. 8 is a view showing a state where the electrolyte membrane undergoes a deformation when the electrolyte membrane and the catalyst layer are delaminated during the operation of a polymer electrolyte is fuel cell.
Figure 8B:
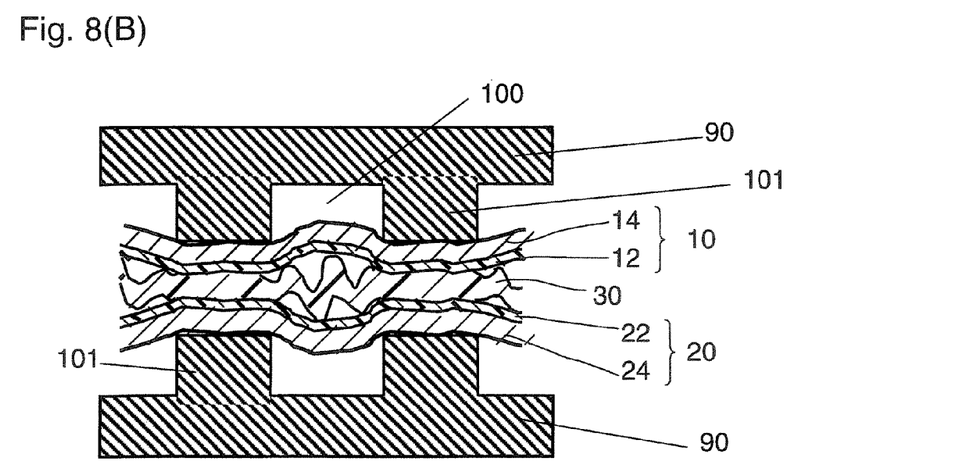

Here, the deformation of the electrolyte membrane in a case where the electrolyte membrane and the catalyst layer are delaminated during the operation of the polymer electrolyte fuel cell will be described with reference to the drawings. FIG. 8(A) is a partially cross sectional view of a polymer electrolyte fuel cell having a membrane/electrode assembly sandwiched by two separators 90. In a case where the electrolyte membrane 30 is not sufficiently bonded to either the first catalyst layer 12 or the second catalyst layer 22, the assembly will be in a state as shown in FIG. 8(B). Namely, at the portion pressed by ribs 101 of the separators 90, the membrane/electrode assembly is fixed, and no delamination takes place between the electrolyte membrane 30 and the catalyst layer 12 or 22, but at the portion being in contact with the gas channel 100, delamination between the electrolyte membrane 30 and the catalyst layer 12 or 22 takes place. And, the hydrated electrolyte membrane 30 undergoes a substantial deformation at the portion delaminated from the catalyst layer 12 or 22.

On the other hand, in a case where the electrolyte membrane 30 is sufficiently bonded to at least one of the catalyst layers 12 and 22, the stabilized shape in the state of FIG. 8(A) can be maintained although the reason is not necessarily clearly understood. In a case where neither the first catalyst layer 12 nor the second catalyst layer 22 is applied directly on the electrolyte membrane by coating, and for example, they are applied to gas diffusion layers 14 and 24, respectively and then bonded to the electrolyte membrane 30 by hot pressing or the like, the bond strength between the electrolyte membrane 30 and the catalyst layer 12 or 22 tends to be low, and the assembly is likely to become in the state of FIG. 8(B) during the operation of the fuel cell.

Here, the bond strength between the electrolyte membrane 30 and the catalyst layer 12 or 22 can be evaluated by the method disclosed in the following Examples. In a case where the 90° peel strength measured by this method is at least 0.1 N/cm, no peeling is likely to take place between the electrolyte membrane 30 and the catalyst layer 12 (or 22) during the operation of the fuel cell, whereby no deformation of the electrolyte membrane 30 is likely to occur. The 90° peel strength is more preferably at least 0.13 N/cm.

EXAMPLES

Now, the present invention will be described in detail with reference to Examples, but it should be understood that the present invention is by no means restricted to such Examples.

Examples 1, 2, 5, 6 and 7 are working examples of the present invention, and Examples 3, 4, and 8 are comparative examples.

Example 1

Step (II-1):

A first gas diffusion layer 14 was prepared which was made of carbon paper with its surface treated by a dispersion containing carbon black particles and polytetrafluoroethylene (trade name: H2315T10AC1, manufactured by NOK Company) (hereinafter referred to as carbon paper (B))

Step (II-2):

35 g of a catalyst having 40% of a platinum/cobalt alloy (platinum/cobalt=36/4 (mass ratio)) dispersed on a carbon support (specific surface area: 250 m$^2$/g), was added to 226.5 g of distilled water and homogenized by means of an ultrasonic homogenizer. Further, 37.5 g of ethanol was added thereto, followed by thorough stirring. Added thereto was 210 g of a dispersion having a solid content of 10 mass % (hereinafter referred to as an ethanol dispersion of copolymer (A)) having a copolymer having sulfonic acid groups (ion exchange capacity: 1.1 meq/g dry resin) (hereinafter referred to as copolymer (A)) obtained by copolymerizing tetrafluoroethylene with $CF_2=CFOCF_2CF(CF_3)O(CF_2)_2SO_2F$, followed by hydrolysis and conversion to an acid form, followed by thorough stirring to obtain a coating fluid (b) for a cathode catalyst layer.

On the surface of a substrate 52 to be peeled, made of a ETFE film, a coating fluid for an electrolyte membrane having a solid content of 25 mass % and having copolymer (A) dispersed in a mixed solvent of ethanol and water (ethanol/water=60/40 (mass ratio)), was applied by a die coater so that the dried film thickness would be 25 μm, followed by drying in a dryer at 90° C. for 10 minutes and further by annealing at 140° C. for 30 minutes to obtain a cast membrane (hereinafter referred to as an ion exchange membrane (C)), and a laminate having an electrolyte membrane 30 made of such a cast membrane was prepared. On the surface of such an electrolyte membrane 30, the coating fluid (b) for a cathode catalyst layer was applied by means of a die coater so that the amount of platinum would be 0.2 mg/cm$^2$, followed by drying in a dryer at 90° C. for 5 minutes and further by drying in a dryer at 120° C. for 30 minutes to prepare a first intermediate 50 having a first catalyst layer 12 (cathode catalyst layer) formed on the surface of the electrolyte membrane 30.

Step (II-3):

33 g of a catalyst (trade name: TEC61E54, manufactured by Tanaka Kikinzoku Kogyo K.K. the amount of platinum/ruthenium alloy supported: 53 mass %) having a platinum/ruthenium alloy (platinum/ruthenium=31/22 (mass ratio)) dispersed on a carbon support (specific surface area: 800 m$^2$/g) was added to 227.5 g of distilled water and homogenized by means of an ultrasonic homogenizer. Further, 117.5 g of ethanol was added thereto, followed by thorough stirring. Added thereto was 122.5 g of the ethanol dispersion of copolymer (A), followed by thorough stirring to obtain a coating fluid (a) for an anode catalyst layer.

On the surface of a second gas diffusion layer 24 made of carbon paper (B), the coating fluid (a) for an anode catalyst layer was applied by means of a die coater so that the amount of platinum would be 0.2 mg/cm$^2$, followed by drying in a dryer at 80° C. for 15 minutes, to prepare a second intermediate 60 having a second catalyst layer 22 (anode catalyst layer) formed on the surface of the second gas diffusion layer 24.

Step (II-4):

The substrate 52 to be peeled was peeled from the first intermediate 50.

Step (II-5):

The first gas diffusion layer 14, the first intermediate 50 and the second intermediate 60 were laminated so that the first catalyst layer 12 was located between the first gas diffusion layer 14 and the electrolyte membrane 30, and the second catalyst layer 22 was located between the second gas diffusion layer 24 and the electrolyte membrane 30. This laminate was put in a press machine preliminarily heated to 140° C. and hot-pressed for one minute under a pressing pressure of 1.5 MPa to obtain a membrane/electrode assembly 1 having an electrode area of 25 cm$^2$, wherein the first electrode 10 was a cathode, and the second electrode 20 was an anode.

The membrane/electrode assembly 1 was assembled into a cell for power generation, and hydrogen (utilization rate: 70%)/air (utilization rate: 50%) was supplied under normal pressure, and the cell voltages at the initial stage of the operation at current densities of 0.2 A/cm$^2$, 0.5 A/cm$^2$ and 1.0 A/cm$^2$ were measured at a cell temperature of 65° C. Here, to the anode side, hydrogen with a dew point of 65° C. was supplied, and to the cathode side, air with a dew point of 65° C. was supplied. The is results are shown in Table 1.

Further, by changing hydrogen to simulated gas (a gas having 20 ppm of CO mixed to a mixed gas comprising 80% of hydrogen and 20% of $CO_2$), the cell voltages at the initial stage of the operation were measured under similar conditions. The results are shown in Table 2.

Further, by measuring the strength when peeling takes place between the electrolyte membrane 30 and the first catalyst layer 12 or when the catalyst layer itself undergoes cohesive failure, the bond strength (peel strength) can thereby be evaluated. Specifically, the following method is adopted.

Figure 9:
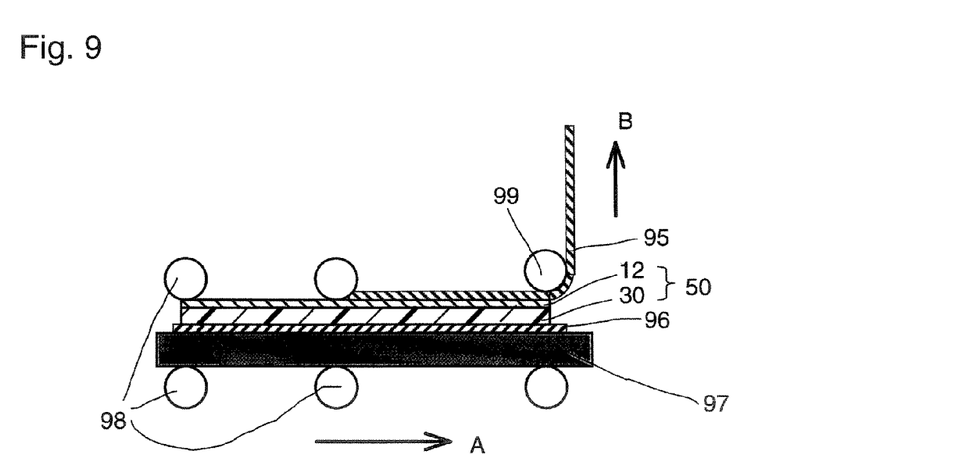
FIG. 9 is a view showing an apparatus for measuring the 90° peel strength between the electrolyte membrane and the catalyst layer in an embodiment of the present invention.

Firstly, from the first intermediate 50, a test specimen having a width of 20 mm and a length of about 150 mm is prepared. And, as shown in FIG. 9, the surface of the electrolyte membrane 30 is bonded to an aluminum plate 97 having a width of 25 mm, a length of 150 mm and a thickness of 3 mm by means of a pressure sensitive adhesive double coated tape 96. Here, the pressure sensitive adhesive double coated tape 96 is one having an adhesive strength sufficiently higher than the peel strength between the electrolyte membrane 30 and the first catalyst layer 12 of the test specimen to be measured. Further, on the surface of the first catalyst layer 12, a single-sided adhesive tape 95 having an adhesive strength sufficiently higher than the peel strength of the test specimen to be measure, is bonded in a length of about 80 mm. And, the single-sided adhesive tape 95 is held by a sample attaching portion of a tensile tester not shown, so that it will be at an angle of 90° against the test specimen via a stainless steel roller 99 having a diameter of 6 mm. The unitary structure of aluminum plate 97/pressure sensitive adhesive double coated tape 96/first intermediate 50/single-sided adhesive tape 95 is advanced in the direction A through a space between rollers 98, and the single-sided adhesive tape 95 is made to advance in the direction B, whereby the strength when the test specimen undergoes peeling between the electrolyte membrane 30 and the first catalyst layer 12, is measured.

As the measuring conditions, the 90° peel strength is measured at a rate of 50 mm/min. The test is carried out three times with respect to each test specimen, and the peel strength is measured via a load cell and recorded in a personal computer. And, with respect to a portion where the values are constant among the peel strengths measured, the average value of the three times is divided by the width of 20 mm of the test specimen to obtain the 90° peel strength of the test specimen.

When measured as described above, the peel strength is at least 0.13 N/cm.

Example 2

The same carbon paper (B) as in Example 1 was prepared as the first gas diffusion layer 14.

On the surface of an electrolyte membrane 30 made of the ion exchange membrane (C), the coating fluid (a) for an anode catalyst layer was applied by means of a die coater so that the amount of platinum would be 0.2 mg/cm$^2$, followed by drying in a dryer at 90° C. for 5 minutes and further by drying in a dryer at 120° C. for 30 minutes to prepare a first intermediate 50 having a first catalyst layer 12 (anode catalyst layer) formed on the surface of the electrolyte membrane 30.

On the surface of the second gas diffusion layer 24 made of carbon paper (B), the coating fluid (b) for a cathode catalyst layer was applied by means of a die coater so that the amount of platinum would be 0.2 mg/cm$^2$, followed by drying in a dryer at 80° C. for 15 minutes to prepare a second intermediate 60 having a second catalyst layer 22 (cathode catalyst layer) formed on the surface of the second gas diffusion layer 24.

From the first intermediate 50, the substrate 52 to be peeled was peeled.

The first gas diffusion layer 14, the first intermediate 50 and the second intermediate 60 were laminated so that the first catalyst layer 12 was located between the first gas diffusion layer 14 and the electrolyte membrane 30, and the second catalyst layer 22 was located between the second gas diffusion layer 24 and the electrolyte membrane 30. This assembly was hot-pressed under the same conditions as in step (II-5) in Example 1 to obtain a membrane/electrode assembly 1 having an electrode area of 25 cm$^2$, wherein the first electrode 10 was an anode, and the second electrode 20 was a cathode.

With respect to the membrane/electrode assembly 1, the cell voltages at the initial stage of the operation were measured under the same conditions as in Example 1. The results are shown in Tables 1 and 2.

Further, with respect to the first intermediate 50, the 90° peel strength test is carried out in the same manner as in Example 1, whereby the peel strength is at least 0.13 N/cm.

Example 3 (Comparative Example)

On the surface of a gas diffusion layer 14 made of carbon paper (B), the coating fluid (b) for a cathode catalyst layer was applied by means of a die coater so that the amount of platinum would be 0.2 mg/cm$^2$, followed by drying in a dryer at 80° C. for 15 minutes to prepare a first electrode 10 (cathode) having a first catalyst layer 12 formed on the surface of the first gas diffusion layer 14.

In the same manner as in step (II-3) in Example 1, a second electrode 20 (anode) having a second catalyst layer 22 formed on the surface of the second gas diffusion layer 24, was prepared.

The first electrode 10, the electrolyte membrane 30 made of the ion exchange membrane (C) and the second electrode 20 were laminated so that the first catalyst layer 12 was located between the first gas diffusion layer 14 and the electrolyte membrane 30, and the second catalyst layer 22 was located between the second gas diffusion layer 24 and the electrolyte membrane 30.

This assembly was hot-pressed under the same conditions as in step (II-5) in Example 1 to obtain a membrane/electrode assembly 1 having an electrode area of 25 cm$^2$, wherein the first electrode 10 was a cathode, and the second electrode 20 was an anode.

With respect to the membrane/electrode assembly 1, the cell voltages at the initial stage of the operation were measured under the same conditions as in Example 1. The results are shown in Tables 1 and 2.

Further, the first electrode 10 and the electrolyte membrane 30 made of the ion exchange membrane (C) were hot-pressed under the same conditions as in step (II-5) in Example 1 to prepare a test specimen having a width of 20 mm and a length of about 150 mm. Further, the second electrode 20 and the electrolyte membrane 30 made of the ion exchange membrane (C) were hot-pressed under the same conditions as in step (II-5) in Example 1 to prepare a test specimen having a width of 20 mm and a length of about 150 mm. And, with respect to the respective test specimens, the 90° peel strength test was carried out by the method disclosed in Example 1, whereby, each had a peel strength of at most 0.08 N/cm.

Example 4 (Comparative Example)

On the surface of a substrate to be peeled made of an ETFE film, the coating fluid (a) for an anode catalyst layer was applied by means of a die coater so that the amount of platinum would be 0.2 mg/cm$^2$, followed by drying in a dryer at 90° C. for 5 minutes to form a first catalyst layer 12 (anode catalyst layer).

The copolymer (A) was dispersed in a mixed solvent of ethanol and water (ethanol/water=70:30 (mass ratio)), to prepare a coating fluid (c) for an electrolyte membrane having a solid content of 22 mass %.

On the surface of the first catalyst layer 12, the coating fluid (c) for an electrolyte membrane was applied by means of a die coater so that the dried membrane thickness would be 10 μm, followed by drying in a dryer at 90° C. for 5 minutes. Further, on the surface, the coating fluid (c) for an electrolyte membrane was applied by means of a die coater so that the dried membrane thickness would be 15 μm, followed by drying in a dryer at 90° C. for 10 minutes and further by drying in a dryer at 130° C. for 5 minutes and further by annealing at 140° C. for 30 minutes, to form an electrolyte membrane 30 having a thickness of 25 μm, thereby to prepare a laminate of the substrate to be peeled/the first catalyst layer/the electrolyte membrane 30.

On the surface of the electrolyte membrane 30, the coating fluid (b) for a cathode catalyst layer was applied by means of a die coater so that the amount of platinum would be 0.2 mg/cm$^2$, followed by drying in a dryer at 90° C. for 5 minutes to form a second catalyst layer 22 (cathode catalyst layer).

Further, drying was carried out in a dryer at 120° C. for 15 minutes to prepare a membrane/catalyst layer assembly. When the cross section of the membrane/catalyst layer assembly was observed by an electron microscope, the ion exchange resin was found to have penetrated into voids in the vicinity of the surface of the first catalyst layer 12.

On each side of the membrane/catalyst layer assembly, carbon paper (B) was disposed as a gas diffusion layer, followed by hot pressing under the same conditions as in step (II-5) in Example 1 to obtain an membrane/electrode assembly 1 having an electrode area of 25 cm$^2$, wherein the first electrode 10 was an anode, and the second electrode 20 was a cathode.

With respect to the membrane/electrode assembly 1, the cell voltages at the initial stage of the operation were measured under the same conditions as in Example 1. The results are shown in Tables 1 and 2.

TABLE 1

| Fuel gas = Hydrogen | Cell voltage (V) | | |
|---|---|---|---|
| | 0.2 A/cm$^2$ | 0.7 A/cm$^2$ | 1.0 A/cm$^2$ |
| Ex. 1 (present invention) | 0.75 | 0.61 | 0.50 |
| Ex. 2 (present invention) | 0.73 | 0.55 | 0.42 |
| Ex. 3 (Comparative Example) | 0.70 | 0.53 | 0.39 |
| Ex. 4 (Comparative Example) | 0.65 | 0.34 | 0 |

TABLE 2

| Fuel gas = Simulated gas | Cell voltage (V) | | |
|---|---|---|---|
| | 0.2 A/cm$^2$ | 0.7 A/cm$^2$ | 1.0 A/cm$^2$ |
| Ex. 1 (present invention) | 0.73 | 0.53 | 0.29 |
| Ex. 2 (present invention) | 0.72 | 0.53 | 0.38 |
| Ex. 3 (Comparative Example) | 0.70 | 0.42 | 0 |
| Ex. 4 (Comparative Example) | 0.64 | 0.31 | 0 |

Example 5

Step (ii-1):

20.0 g of carbon fiber grown in a gas phase (trade name: VGCF-H, manufactured by Showa Denko K.K., fiber diameter: about 150 nm, fiber length: 10 to 20 μm) was added to 180 g of distilled water, followed by thorough stirring. Added thereto was 200 g of an ethanol dispersion of copolymer (A), followed by thorough stirring. Further, mixing and homogenizing were carried out by means of a homogenizer to obtain a coating fluid (h) for a cathode carbon layer.

On the surface of carbon paper (B) the coating fluid (h) for a cathode carbon layer was applied by means of a die coater so that the amount of the solid content would be 0.8 mg/cm$^2$, followed by drying in a dryer at 80° C. for 15 minutes to prepare a first gas diffusion layer 14 having (a first) carbon layer 84 formed on the surface of the gas-diffusing substrate 82.

Step (ii-2):

A laminate was prepared which had an electrolyte membrane 30 made of an ion exchange membrane (C) having a thickness of 25 μm formed on the surface of a substrate 52 to be peeled made of an ETFE film. On the surface of the electrolyte membrane 30, the coating fluid (b) for a cathode catalyst layer was applied by means of a die coater so that the amount of platinum would be 0.2 mg/cm$^2$, followed by drying in a dryer at 90° C. for 5 minutes and further by drying in a dryer at 120° C. for 15 minutes to prepare a first intermediate 50 having a first catalyst layer 12 (cathode catalyst layer) formed on the surface of the electrolyte membrane 30.

Step (ii-3):

To 20 g of carbon fiber grown in a gas phase (trade name: VGCF-H, manufactured by Showa Denko K.K., fiber diameter: about 150 nm, fiber length: 10 to 20 μm), 27 g of ethanol and 153 g of distilled water were added, followed by thorough stirring. Added thereto was 140 g of an ethanol dispersion of copolymer (A), followed by thorough stirring. Further, mixing and homogenizing were carried out by means of a homogenizer to obtain a coating fluid (g) for an anode carbon layer.

On the surface of carbon paper (B), the coating fluid (g) for an anode carbon layer was applied by means of a die coater so that the amount of the solid content would be 0.8 mg/cm$^2$, followed by drying in a dryer at 80° C. for 15 minutes to prepare a second gas diffusion layer 24 having (a second) carbon layer 84 formed on the surface of the gas-diffusing substrate 82.

On the surface of the carbon layer 84 of the second gas diffusion layer 24, the coating fluid (a) for an anode catalyst layer was applied by means of a die coater so that the amount of platinum would be 0.2 mg/cm$^2$, followed by drying in a dryer at 80° C. for 15 minutes to prepare a second intermediate 60 having a second catalyst layer 22 (anode catalyst layer) formed on the surface of the second gas diffusion layer 24.

Step (ii-4):

From the first intermediate 50, the substrate 52 to be peeled was peeled.

Step (ii-5):

The first gas diffusion layer 14, the first intermediate 50 and the second intermediate 60 were laminated so that the first catalyst layer 12 was located between the first gas diffusion layer 14 and the electrolyte membrane 30, and the carbon layer 84 and the first catalyst layer 12 were in contact with each other, and the second catalyst layer 22 was located between the second gas diffusion layer 24 and the electrolyte membrane 30. This laminate was hot-pressed under the same conditions as in step (II-5) in Example 1 to obtain a membrane/electrode assembly 1 having an electrode area of 25 cm$^2$, wherein the first electrode 10 was a cathode, and the second electrode 20 was an anode, and both the cathode and the anode have carbon layers 84.

With respect to the membrane/electrode assembly 1, the cell voltages at the initial stage of the operation were measured under the same conditions as in Example 1. The results are shown in Tables 3 and 4.

Further, with respect to the first intermediate 50, the 90° peel strength test was carried out by the method disclosed in Example 1. As a result, the peel strength was at least 0.13 N/cm.

Example 6

Step (ii-1):

On the surface of carbon paper (B), the coating fluid (g) for an anode carbon layer was applied by means of a die coater so that the amount of the solid content would be 0.8 mg/cm$^2$, followed by drying in a dryer at 80° C. for 15 minutes to prepare a first gas diffusion layer 14 having (a first) carbon layer 84 formed on the surface of the gas-diffusing substrate 82.

Step (ii-2):

A laminate was prepared which had an electrolyte membrane 30 made of the ion exchange membrane (C) having a thickness of 25 μm formed on the surface of the substrate 52 to be peeled made of an ETFE film. On the surface of the electrolyte membrane 30, the coating fluid (a) for an anode catalyst layer was applied by means of a die coater so that the amount of platinum would be 0.2 mg/cm$^2$, followed by drying in a dryer at 90° C. for 5 minutes and further by drying in a dryer at 120° C. for 15 minutes to prepare a first intermediate 50 having a first catalyst layer 12 (anode catalyst layer) formed on the surface of the electrolyte membrane 30.

Step (ii-3):

On the surface of carbon paper (B), the coating fluid (h) for a cathode carbon layer was applied by means of a die coater so that the amount of the solid content would be 0.8 mg/cm$^2$, followed by drying in a dryer at 80° C. for 15 minutes to prepare a second gas diffusion layer 24 having (a second) carbon layer 84 formed on the surface of the gas-diffusing substrate 82.

25 g of a catalyst (platinum/cobalt=36/4 (mass ratio)) having 40% of a platinum/cobalt alloy dispersed on a carbon support (specific surface area: 250 m$^2$/g) was added to 322 g of distilled water and homogenized by means of an ultrasonic homogenizer, and further, 3 g of ethanol was added, followed by thorough stirring. Added thereto was 150 g of an ethanol dispersion of copolymer (A), followed by thorough stirring to obtain a coating fluid (b2) for a cathode catalyst layer.

On the surface of the carbon layer 84 of the second gas diffusion layer 24, the coating fluid (b2) for a cathode catalyst layer was applied by means of a die coater so that the amount of platinum would be 0.2 mg/cm$^2$, followed by drying in a dryer at 80° C. for 15 minutes to prepare a second intermediate 60 having a second catalyst layer 22 (cathode catalyst layer) formed on the surface of the second gas diffusion layer 24.

Step (ii-4):

From the first intermediate 50, the substrate 52 to be peeled was peeled.

Step (ii-5):

The first gas diffusion layer 14, the first intermediate 50 and the second intermediate 50 were laminated so that the first catalyst layer 12 was located between the first gas diffusion layer 14 and the electrolyte membrane 30, and (the first) carbon layer 84 and the first catalyst layer 12 were in contact with each other, and the second catalyst layer 22 was located between the second gas diffusion layer 24 and the electrolyte membrane 30. This laminate was hot-pressed under the same conditions as in step (II-5) in Example 1 to obtain a membrane/electrode assembly 1 having an electrode area of 25 cm$^2$, wherein the first electrode 10 was an anode, the second electrode 20 was a cathode, and both the cathode and the anode had carbon layers 84.

With respect to the membrane/electrode assembly 1, the cell voltages at the initial stage of the operation were measured under the same conditions as in Example 1. The results are shown in Tables 3 and 4.

Further, with respect to the first intermediate 50, the 90° peel strength test was carried out by the method disclosed in Example 1. As a result, the peel strength was at least 0.19 N/cm.

Example 7

Step (i-1):

On the surface of carbon paper (B), the coating fluid (g) for an anode carbon layer was applied by means of a die coater so that the amount of the solid content would be 0.8 mg/cm$^2$, followed by drying in a dryer at 80° C. for 15 minutes to prepare a first gas diffusion layer 14 having (a first) carbon layer 84 formed on the surface of the gas-diffusing substrate 82.

Step (i-2):

A laminate was prepared which had an electrolyte membrane 30 made of the ion exchange membrane (C) having a thickness of 25 μm formed on the surface of the substrate 52 to be peeled made of an ETFE film. On the surface of the electrolyte membrane 30, the coating fluid (a) for an anode catalyst was applied by means of a die coater so that the amount of platinum would be 0.2 mg/cm$^2$, followed by drying in a dryer at 90° C. for 5 minutes and further by drying in a dryer at 120° C. for 15 minutes to prepare a first intermediate 50 having a first catalyst layer 12 (anode catalyst layer) formed on the surface of the electrolyte membrane 30.

Step (i-3):

On the surface of carbon paper (B), the coating fluid (h) for a cathode carbon layer was applied by means of a die coater so that the amount of the solid content would be 0.8 mg/cm$^2$, followed by drying in a dryer at 80° C. for 15 minutes to prepare a second gas diffusion layer 24 having (a second) carbon layer 84 formed on the surface of the gas-diffusing substrate 82.

25 g of a catalyst (platinum/cobalt=36/4 (mass ratio)) having 40% of a platinum/cobalt alloy dispersed on a carbon support (specific surface area: 250 m$^2$/g) was added to 322.0 g of distilled water and homogenized by means of an ultrasonic homogenizer, and further, 3 g of ethanol was added, followed by thorough stirring. Added thereto was 150 g of an ethanol dispersion of copolymer (A), followed by thorough stirring to obtain a coating fluid (b2) for a cathode catalyst layer.

On the surface of the carbon layer 84 of the second gas diffusion layer 24, the coating fluid (b2) for a cathode catalyst layer was applied by means of a die coater so that the amount of platinum would be 0.2 mg/cm$^2$, followed by drying in a dryer at 80° C. for 15 minutes to prepare a second intermediate 60 having a second catalyst layer 22 (cathode catalyst layer) formed on the surface of the second gas diffusion layer 24.

Step (i-4):

The first gas diffusion layer 14 and the first intermediate 50 were laminated so that the first catalyst layer 12 was located between the first gas diffusion layer 14 and the electrolyte membrane 30, and (the first) carbon layer 84 and the first catalyst layer 12 were in contact with each other. This laminate was hot-pressed under the same conditions as in step (II-5) in Example 1 to obtain a laminate 70 having the first gas diffusion layer and the first intermediate 50 bonded to each other.

Step (i-5):

From the above laminate 70, the substrate 52 to be peeled was peeled, and the laminate 70 and the second intermediate 60 were laminated so that the second catalyst layer 22 was located between the second gas diffusion layer 24 and the electrolyte membrane 30. This laminate was hot-pressed under the same conditions as in step (II-5) in Example 1 to obtain a membrane/electrode assembly 1 having an electrode area of 25 cm$^2$, wherein the first electrode 10 was an anode, and the second electrode 20 was a cathode, and both the cathode and the anode had carbon layers 84.

With respect to the membrane/electrode assembly 1, the cell voltages at the initial stage of the operation were measured under the same conditions as in Example 1. The results are shown in Tables 3 and 4.

Example 8 (Comparative Example)

In the same manner as in step (ii-3) in Example 6, a first electrode 10 was prepared which had a first catalyst layer 12 (cathode catalyst layer) formed on the surface of (the first) carbon layer 84 of the first gas diffusion layer 14.

In the same manner as in step (ii-3) in Example 4, a second electrode 20 was prepared which had a second catalyst layer 22 (anode catalyst layer) formed on the surface of (a second) carbon layer 84 of the second gas diffusion layer 24.

The first electrode 10, the electrolyte membrane 30 made of the ion exchange membrane (C) and the second electrode 20 were laminated so that the first catalyst layer 12 was located between the first gas diffusion layer 14 and the electrolyte layer 30, and the second catalyst layer 22 was located between the second gas diffusion layer 24 and the electrolyte membrane 30.

This laminate was hot-pressed under the same conditions as in step (II-5) in Example 1 to obtain a membrane/electrode assembly 1 having an electrode area of 25 cm², wherein the first electrode 10 was a cathode, and the second electrode 20 was an anode and having a carbon layer 84.

With respect to the membrane/electrode assembly 1, the cell voltages at the initial stage of the operation were measured under the same conditions as in Example 1. The results are shown in Tables 3 and 4.

Further, the first electrode 10 and the electrolyte membrane 30 made of the ion exchange membrane (C) were hot-pressed under the same conditions as in step (II-5) in Example 1 to prepare a test specimen having a width of 20 mm and a length of about 150 mm. Further, the second electrode 20 and the electrolyte membrane 30 made of the ion exchange membrane (C) were hot-pressed under the same conditions as in step (II-5) in Example 1 to prepare a test specimen having a width of 20 mm and a length of about 150 mm. And, each test specimen was subjected to a 90° peel strength test by the method disclosed in Example 1, and each had a peel strength of at most 0.08 N/cm.

TABLE 3

| | Cell voltage (V) | | |
|---|---|---|---|
| Fuel gas = Hydrogen | 0.2 A/cm² | 0.7 A/cm² | 1.0 A/cm² |
| Ex. 5 (present invention) | 0.75 | 0.63 | 0.52 |
| Ex. 6 (present invention) | 0.77 | 0.65 | 0.54 |
| Ex. 7 (present invention) | 0.77 | 0.66 | 0.57 |
| Ex. 8 (Comparative Example) | 0.75 | 0.63 | 0.52 |

TABLE 4

| | Cell voltage (V) | | |
|---|---|---|---|
| Fuel gas = Simulated gas | 0.2 A/cm² | 0.7 A/cm² | 1.0 A/cm² |
| Ex. 5 (present invention) | 0.74 | 0.60 | 0.49 |
| Ex. 6 (present invention) | 0.76 | 0.63 | 0.50 |
| Ex. 7 (present invention) | 0.76 | 0.63 | 0.53 |
| Ex. 8 (Comparative Example) | 0.74 | 0.59 | 0.48 |

From the results in Tables 1 to 4, it is evident that by using the membrane/electrode assemblies of the present invention, it is possible to obtain a high output voltage in each of the low current density region and the high current density region.

INDUSTRIAL APPLICABILITY

The membrane/electrode assembly of the present invention has a high output voltage in a wide range of current densities and thus is very useful for polymer electrolyte fuel cells to be used for power sources for mobiles such as automobiles, distributed power generation systems, household cogeneration systems, etc.

What is claimed is:

1. A process for producing a membrane/electrode assembly comprising a first electrode having a first catalyst layer and a first gas diffusion layer, a second electrode having a second catalyst layer and a second gas diffusion layer, and an electrolyte membrane interposed between the first electrode and the second electrode, which comprises:

applying a coating fluid comprising an ion exchange resin on a substrate, followed by annealing at from 100 to 250° C. to form an electrolyte membrane, and applying a coating fluid comprising an electrode catalyst and an ion exchange resin on the surface of the obtained electrolyte membrane to form the first catalyst layer, thereby to prepare a first intermediate consisting of said substrate, the electrolyte membrane and the first catalyst layer;

applying a coating fluid comprising an electrode catalyst and an ion exchange resin on the surface of the second gas diffusion layer to form the second catalyst layer, thereby to prepare a second intermediate consisting of the second gas diffusion layer and the second catalyst layer; and bonding the first gas diffusion layer to the first intermediate, so that the first catalyst layer is located between the first gas diffusion layer and the electrolyte membrane, peeling said substrate from said first intermediate after bonding said first intermediate and said first gas diffusion layer, bonding said second intermediate to the electrolyte membrane so that said second catalyst layer is located between the second gas diffusion layer and the electrolyte membrane, and wherein the first gas diffusion layer comprises a gas-diffusing substrate and a first carbon layer formed on the surface of the gas-diffusing substrate by applying a coating fluid comprising a fluorinated ion exchange resin and carbon fiber having a fiber diameter of from 50 to 200 nm and a fiber length of from 1 to 50 µm, and the first gas diffusion layer and the first intermediate are bonded, so that the first carbon layer and the first catalyst layer are in contact with each other.

2. The process for producing a membrane/electrode assembly according to claim 1, wherein the bondings of the first gas diffusion layer, the first intermediate and the second intermediate, are carried out by hot pressing.

3. The process for producing a membrane/electrode assembly according to claim 1, wherein the second gas diffusion layer comprises a gas-diffusing substrate and a second carbon layer formed on the surface of the gas-diffusing substrate by applying a coating fluid comprising a fluorinated ion exchange resin and carbon fiber having a fiber diameter of from 50 to 200 nm and a fiber length of from 1 to 50 µm, and the second catalyst layer is formed on the surface of the second gas diffusion layer, so that the second carbon layer and the second catalyst layer are in contact with each other.

4. The process for producing a membrane/electrode assembly according to claim 1, wherein the ion exchange resin on the substrate, the ion exchange resin in the first catalyst layer, and the ion exchange resin in the second catalyst layer, are each independently selected to be a fluorinated ion exchange resin comprising a copolymer obtained by a process comprising copolymerizing tetrafluoroethylene with a compound represented by formula (1) $CF_2=CF(OCF_2CFX)_m-O_p-(CF_2)_n-SO_2F$, wherein m is an integer of from 0 to 3, n is an integer of from 1 to 12, p is 0 or 1, and X is F or $CF_3$.

5. The process for producing a membrane/electrode assembly according to claim 4, wherein compound represented by formula (1) is $$CF_2=CFO(CF_2)_qSO_2F \qquad (14)$$

wherein q is an integer from 1 to 8.

6. The process for producing a membrane/electrode assembly according to claim 4, wherein compound represented by formula (1) is $$CF_2=CFOCF_2CF(CF_3)O(CF_2)_rSO_2F \quad (1\text{-}2)$$

wherein r is an integer from 1 to 8.

7. The process for producing a membrane/electrode assembly according to claim 4, wherein compound represented by formula (1) is $$CF_2=CF(OCF_2CF(CF_3))_tO(CF_2)_sSO_2F \quad (1\text{-}3)$$

wherein s is an integer from 1 to 8, and t is an integer of from 1 to 3.

8. The process for producing a membrane/electrode assembly according to claim 4, wherein the mass ratio of the electrode catalyst to the fluorinated ion exchange resin is from 4/6 to 9.5/0.5.

9. The process for producing a membrane/electrode assembly according to claim 4, wherein the mass ratio of the electrode catalyst to the fluorinated ion exchange resin is from 6/4 to 8/2.

10. The process for producing a membrane/electrode assembly according to claim 1, wherein the ion exchange resin on the substrate, the ion exchange resin in the first catalyst layer, and the ion exchange resin in the second catalyst layer, are each independently selected to be a non-fluorinated ion exchange resin selected from the group consisting of a sulfonated polyarylene, a sulfonated polybenzoxazole, a sulfonated polybenzothiazole, a sulfonated polybenzoimidazole, a sulfonated polysulfone, a sulfonated polyether sulfone, a sulfonated polyether ether sulfone, a sulfonated polyphenylene sulfone, a sulfonated polyphenylene oxide, a sulfonated polyphenylene sulfoxide, a sulfonated polyphenylene sulfide, a sulfonated polyphenylene sulfide sulfone, a sulfonated polyether ketone, a sulfonated polyether ether ketone, a sulfonated polyether ketone ketone and a sulfonated polyimide.

11. The process for producing a membrane/electrode assembly according to claim 1, wherein the catalyst layer comprises platinum in an amount of from 0.01 to 0.5 mg/cm$^2$.

12. The process for producing a membrane/electrode assembly according to claim 1, wherein the annealing temperature is from 130 to 220° C.

13. The process for producing a membrane/electrode assembly according to claim 1, wherein prior to the annealing, the coating fluid comprising an ion exchange resin on the substrate is dried at a temperature of from 70 to 170° C.

14. The process for producing a membrane/electrode assembly according to claim 1, wherein concurrent to the annealing, the coating fluid comprising an ion exchange resin on the substrate is dried at a temperature of from 70 to 170° C.

15. The process for producing a membrane/electrode assembly according to claim 1, wherein the annealing temperature is from Tg to Tg+100, wherein Tg is the glass transition temperature of the ion exchange resin.

* * * * *